(12) United States Patent
Vaughn, Jr. et al.

(10) Patent No.: US 7,918,332 B2
(45) Date of Patent: Apr. 5, 2011

(54) CANTILEVER ROLL-UP CONVEYOR ARRANGEMENT

(75) Inventors: Donald R. Vaughn, Jr., Roscoe, IL (US); Mark A. Frondal, Winnegabo, IL (US); Charles J. Abramson, Loves Park, IL (US)

(73) Assignee: Chrysler Group LLC, Auburn Hills, MI (US)

( * ) Notice: Subject to any disclaimer, the term of this patent is extended or adjusted under 35 U.S.C. 154(b) by 315 days.

(21) Appl. No.: 12/146,947

(22) Filed: Jun. 26, 2008

(65) Prior Publication Data

US 2009/0000911 A1    Jan. 1, 2009

Related U.S. Application Data

(60) Provisional application No. 60/937,657, filed on Jun. 29, 2007.

(51) Int. Cl.
*B65G 41/00*    (2006.01)
*B65G 21/00*    (2006.01)
*B65G 15/26*    (2006.01)
*B65G 17/28*    (2006.01)
*B65G 21/14*    (2006.01)
*B65G 15/14*    (2006.01)
*B65G 17/12*    (2006.01)

(52) U.S. Cl. ........ 198/801; 198/300; 198/586; 198/594; 198/602; 198/860.1; 198/861.1

(58) Field of Classification Search .................. 198/300, 198/586, 594, 602, 801, 860.1, 861.1
See application file for complete search history.

(56) References Cited

U.S. PATENT DOCUMENTS

| 3,804,603 | A  | * | 4/1974 | Wion | ............................ 29/715 |
| 6,227,377 | B1 | * | 5/2001 | Bonnet | ....................... 209/650 |
| 6,286,356 | B1 | * | 9/2001 | Sakaguchi et al. | ............. 72/324 |
| 7,080,541 | B2 | * | 7/2006 | Xiong | ....................... 72/405.02 |

\* cited by examiner

*Primary Examiner* — Gene Crawford
*Assistant Examiner* — Yolanda Cumbess
(74) *Attorney, Agent, or Firm* — Ralph E. Smith

(57) ABSTRACT

The present invention is a conveyor arrangement for a stamping die employed within a stamping press. The conveyor arrangement has a fixed conveyor with a protruding end, wherein the fixed conveyor is mounted on the die for receiving and shuttling stamped parts from the die. The conveyor arrangement also has a moveable conveyor with a supported first end and a cantilevered second end, wherein the moveable conveyor is arranged for positioning the second end under the fixed conveyor's protruding end for receiving and shuttling stamped parts from the fixed conveyor.

13 Claims, 5 Drawing Sheets

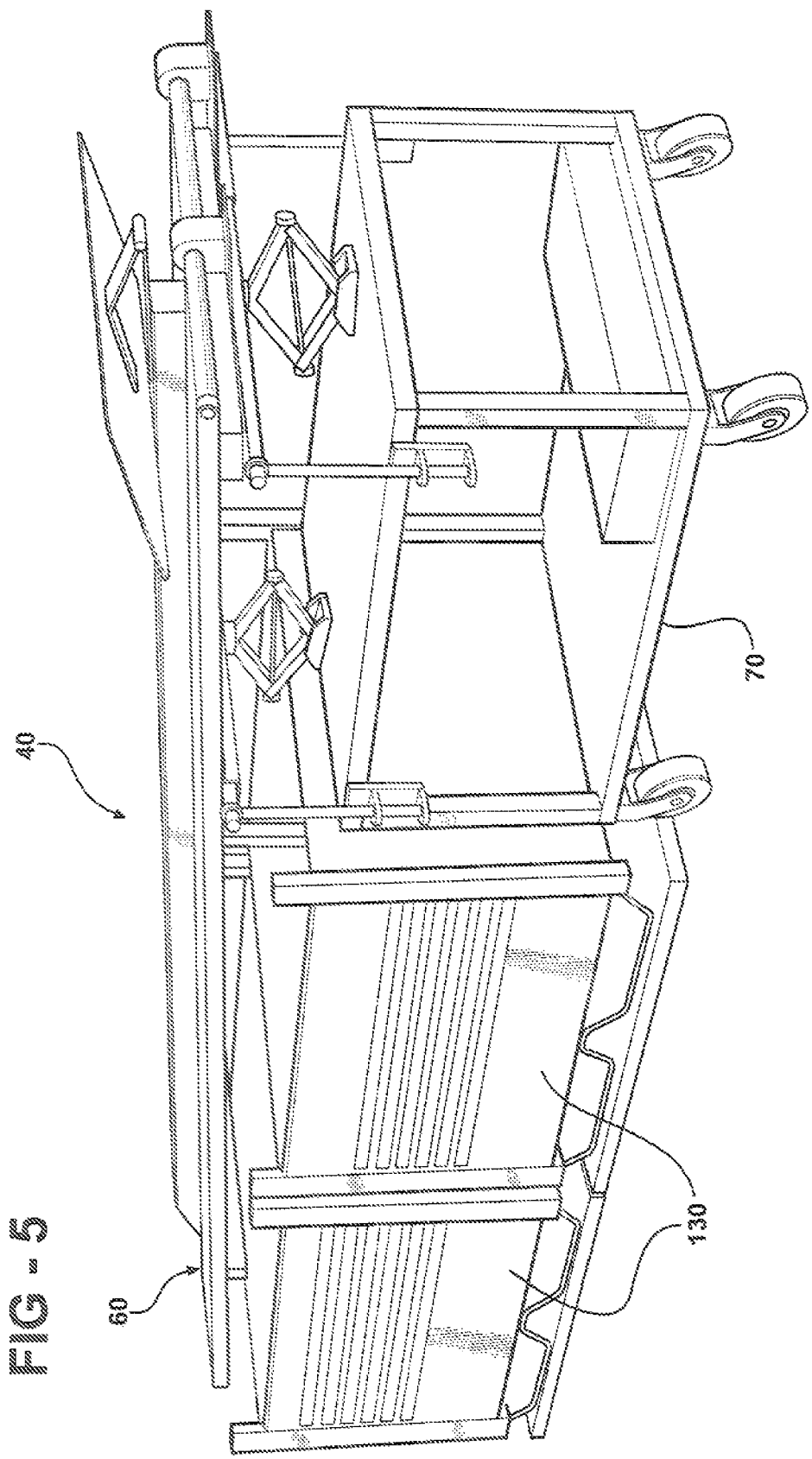

US 7,918,332 B2

CANTILEVER ROLL-UP CONVEYOR ARRANGEMENT

CROSS REFERENCE TO RELATED APPLICATION

This application claims the benefit of U.S. Provisional Patent Application Ser. No. 60/937,657, filed Jun. 29, 2007.

FIELD OF THE INVENTION

The present invention relates to a conveyor, and more particularly to a cantilever roll-tip conveyor arrangement for shuttling stamped parts away from a stamping-die press.

BACKGROUND OF THE INVENTION

Stamping-die presses are widely utilized in the manufacturing field. Stamping-die presses are typically configured to work in conjunction with various conveyors arranged to transport stamped parts from the press to a collection area. Some stamping-die presses may be adapted to store a conveyor inside the press assembly.

Stamping-die presses often include tandem pull-out, or extendable, conveyors which are mounted on the stamping die. As a result of being mounted on the die, such an extendable, conveyor typically becomes an integral part of the die assembly for purposes of die changeover, i.e. its installation and removal. As part of the die, an extendable conveyor may be conveniently stored within the stamping press when the die is idle and be extended when the die is in use. During press set-up a die setter generally extends the conveyor from inside the press die and positions the conveyor on a wheeled support stand, thus providing a transfer path for stamped parts from the press to a part collection area.

Because an extendable conveyor is an integral part of the die, however, set-up and knock-down of the conveyor and the die cannot be performed concurrently, thus requiring more time to be spent daring die changeover. Due to the space constraints, storing an extendable conveyor inside the press may drive a snug fit between the conveyor and the die rails. Consequently, tight clearance between the conveyor and the die may hinder access to the die and complicate die changeover. Additionally, such a tight clearance may cause significant friction and resistance during extension and/or retraction of the conveyor. Furthermore, depending on its length, an extendable conveyor may require an anti-tip mechanism, i.e. an arrangement to resist conveyor lean and collapse, built into its structure. A built-in anti-tip mechanism may make set-up of the conveyor complex and unwieldy. However, once set-up, such an extendable conveyor structure may still be prone to sagging due to insufficient rigidity.

All the foregoing complications with the set-up of a stamping die employing an extendable conveyor may drive an increase in the die changeover cycle-time. Typically, however, die changeover cycle time is a critical factor in the manufacturing facility's efficiency metric.

SUMMARY OF THE INVENTION

The present invention is a conveyor arrangement for a stamping die employed within a stamping press. According to the invention the conveyor arrangement has a fixed conveyor with a protruding end aid a first track. The fixed conveyor is mounted on the die for receiving and shuttling stamped parts from, the die. The conveyor arrangement also has a moveable conveyor with a supported first end, a cantilevered second end, and a second track. The moveable conveyor's cantilevered second end is arranged for positioning under the fixed conveyor's protruding end for receiving and shuttling stamped parts from the first track via the second track to a remote part collection area.

According to the invention the moveable conveyor's first end may be positioned outside an enclosure for the stamping, press and the moveable conveyor's second end be inserted through an aperture in the enclosure. The conveyor arrangement may further include a receptacle for positioning next to the moveable conveyor's first end for receiving stamped parts. The conveyor arrangement may further include a drive-motor positioned at the moveable conveyors first end for driving the second track. The moveable conveyor may additionally include a rolling support positioned at the moveable conveyor's first end for transporting the moveable conveyor. The moveable conveyor's first end may further include a regulator between the support and the first track for the second end's vertical position. The moveable conveyor may include a support rib running substantially the length of the second track for increased conveyor rigidity.

It should be understood that the detailed description and specific examples which follow, while indicating preferred embodiments of the invention, are intended for purposes of illustration only and are not intended to limit the scope of the invention.

BRIEF DESCRIPTION OF THE DRAWINGS

FIG. 5 is a perspective view of a moveable conveyor not in operation, with receptacle bins stowed under its cantilevered second end.

DETAILED DESCRIPTION OF THE INVENTION

In general, the present invention relates to a conveyor for a stamping-die press. More specifically the present invention is a cantilever roll-up conveyor arrangement for a manufacturing facility, to be used for shuttling stamped parts from a stamping-die press to a remote part collection area. According to the invention, the cantilever roll-up conveyor arrangement provides an efficient and sturdy conveyor set up and facilitates convenient disassembly and storage of same.

Figure 1:
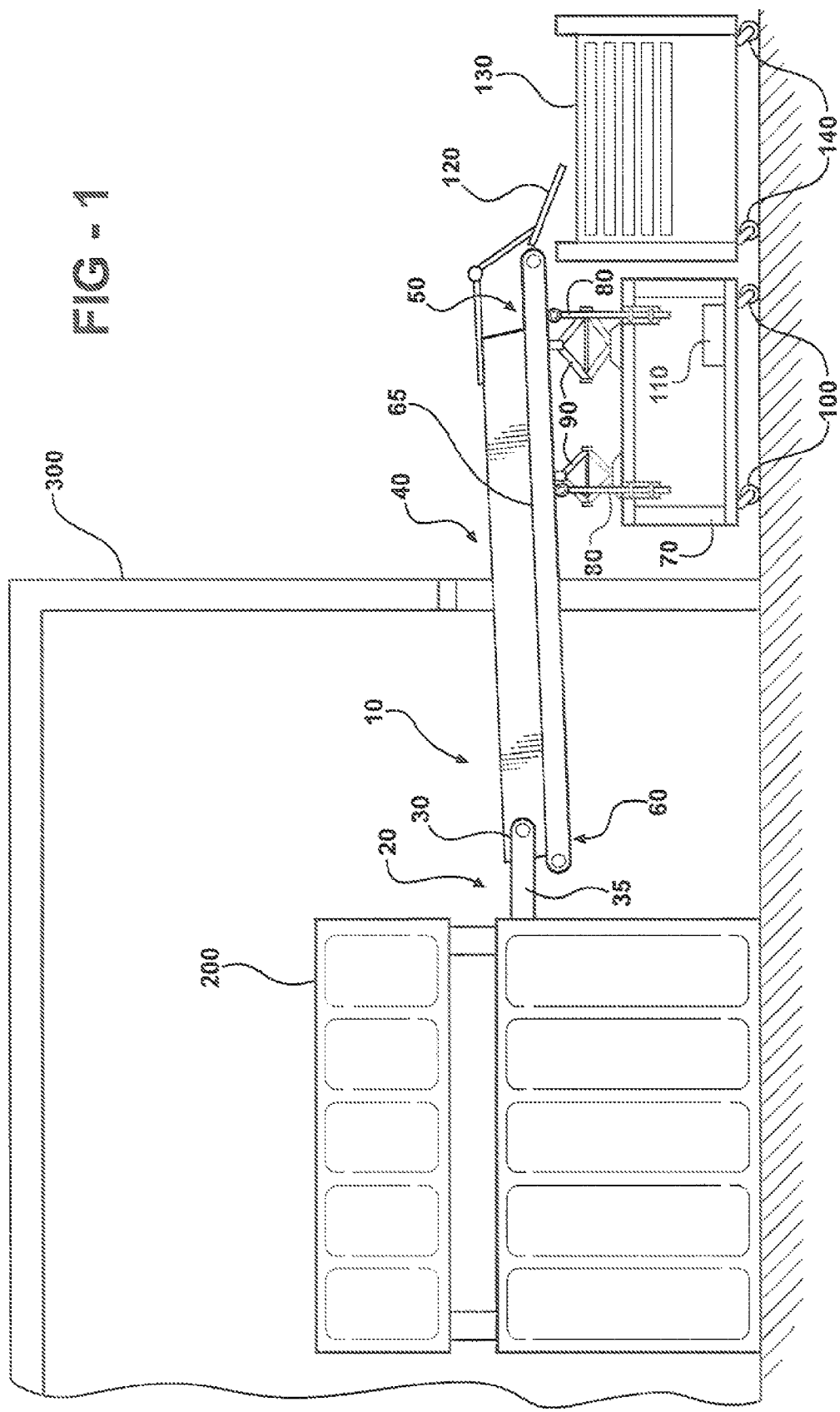
FIG. 1 is a schematic side elevational view of a stamping die press and a cantilever roil-up conveyor arrangement on a manufacturing facility floor according to the invention.

Referring now to the drawings, like elements of the invention are identified with identical reference-numerals throughout. FIG. 1 denotes a schematic side elevational view of cantilever roll-up conveyor arrangement 10 situated on a manufacturing facility floor. Conveyor arrangement 10 includes fixed conveyor 20, Fixed conveyor 20 is mounted on stamping die press 200 for receiving stamped parts from die press 200. Stamping die press 200 is positioned inside press enclosure 300, which is typically done to attenuate noise generated by a die press during its operation. Fixed conveyor 20 includes moveable first track 30 for shuttling stamped parts from the die press to the fixed conveyor's protruding end 35. Conveyor arrangement 10 also includes moveable conveyor 40. Moveable conveyor 40 includes supported first end 50 and cantilevered second end 60. Second end 60 is positioned outside press enclosure 300 and is inserted through aperture 350 for positioning under protruding end 35. Moveable conveyor 40 additionally includes moveable second track 65 for receiving and shuttling stamped parts from protruding end 35 to a remote part collection area. Tracks 30 and 65 may consist of two or more pulleys (not shown) and a continuous loop of material, e.g. a belt or a chain, rotating about the pulleys. At least one of the pulleys is powered, to thereby move the loop of material and shuttle the parts on it forward. Similarly, consistent with the invention, the cantilever roll-up conveyor arrangement may include rollers to facilitate a gravity-feed movement of parts in place of the powered movement via the continuous loop of material.

First end 50 is attached to support 70 via linkages 80 and jacks 90. Linkages 80 and jacks 90 provide vertical adjustment of the second end. Jacks 90 may be adjusted to change the attitude and angle of track 65 in order to selectively raise or lower the second end 60 and facilitate its positioning under protruding end 35. Linkages 80 are height adjustable, and may be used to provide lateral stability for second track 65 and secure its position after such is selected via jacks 90. Support 70 includes casters 100 to facilitate repositioning of moveable conveyor 40. Support 70 additionally includes ballast 110 for counterweighing second end 60 and establishing a balanced stance of moveable conveyor 40. Slide plate 120 is attached to first end 50 to facilitate delivery of stamped parts from second track 65 to receptacle bin 130. Receptacle bin 130 may have casters 140 to facilitate positioning of bin 130 near first end 50.

Figure 2:
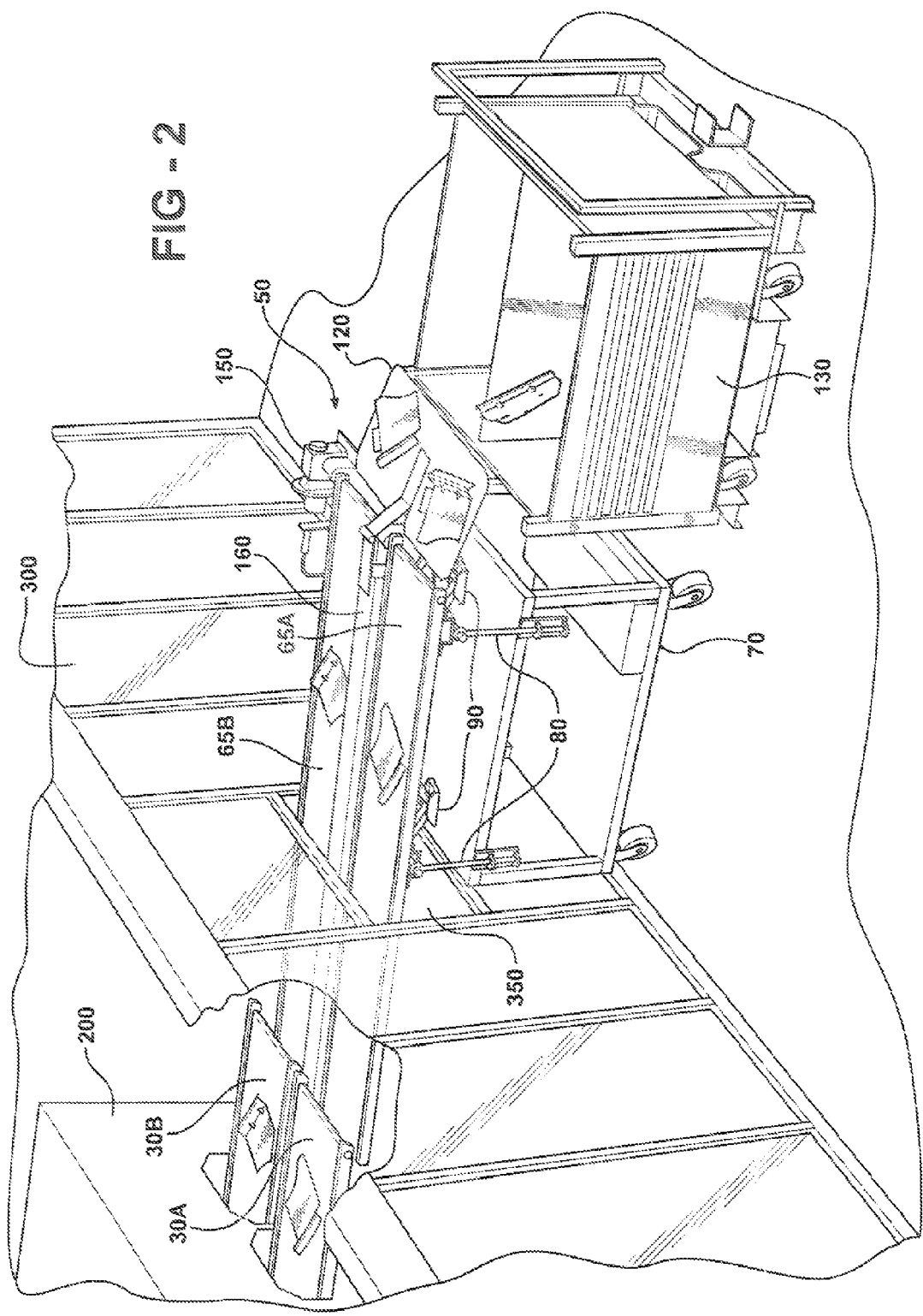
FIG. 2 is an overhead perspective view of the cantilever roll-up conveyor arrangement during operation.
Figure 3:
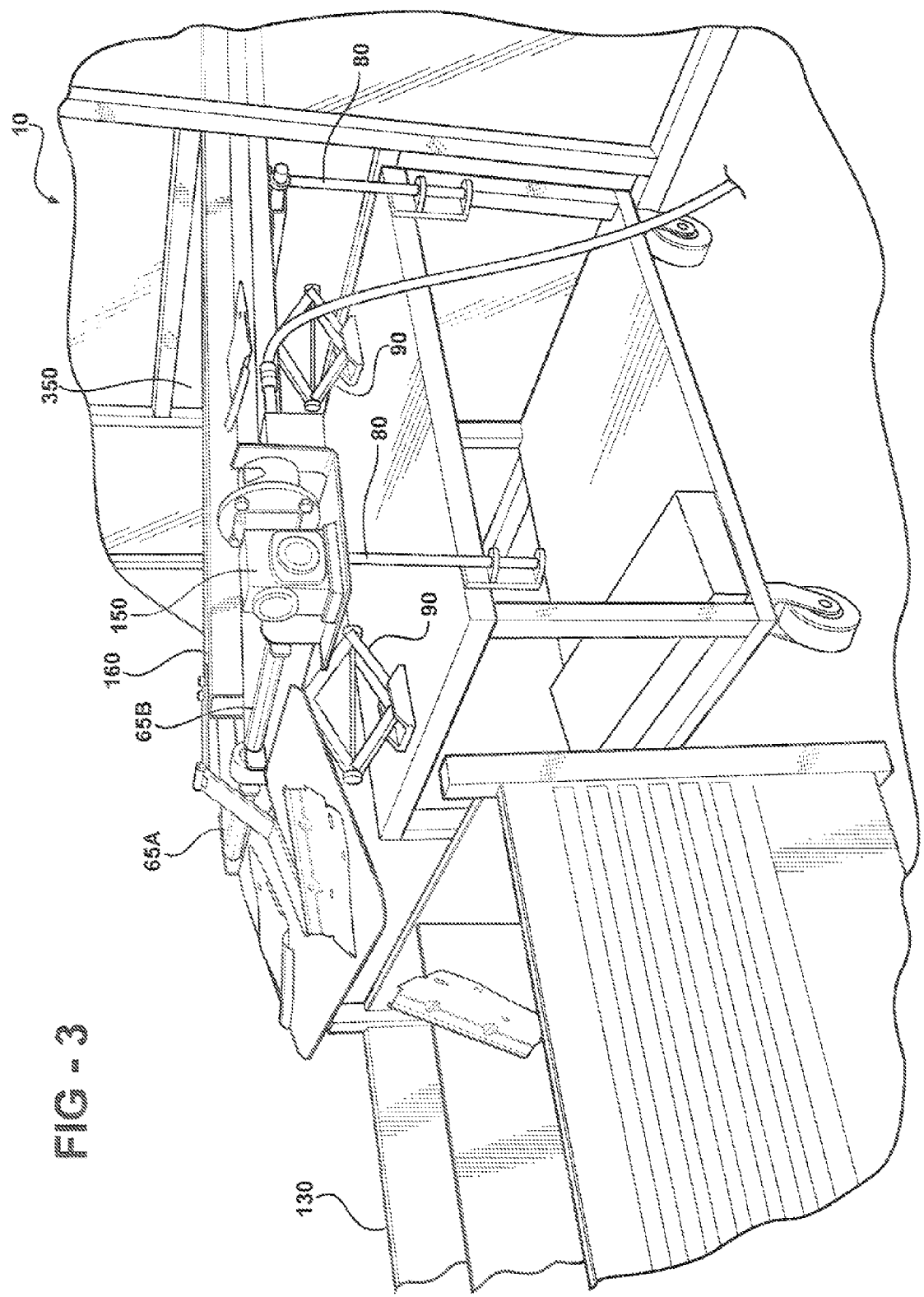
FIG. 3 is a close-up perspective view of a supported first end of a cantilever roll-up conveyor arrangement, outside of a stamping die press enclosure.
Figure 4:
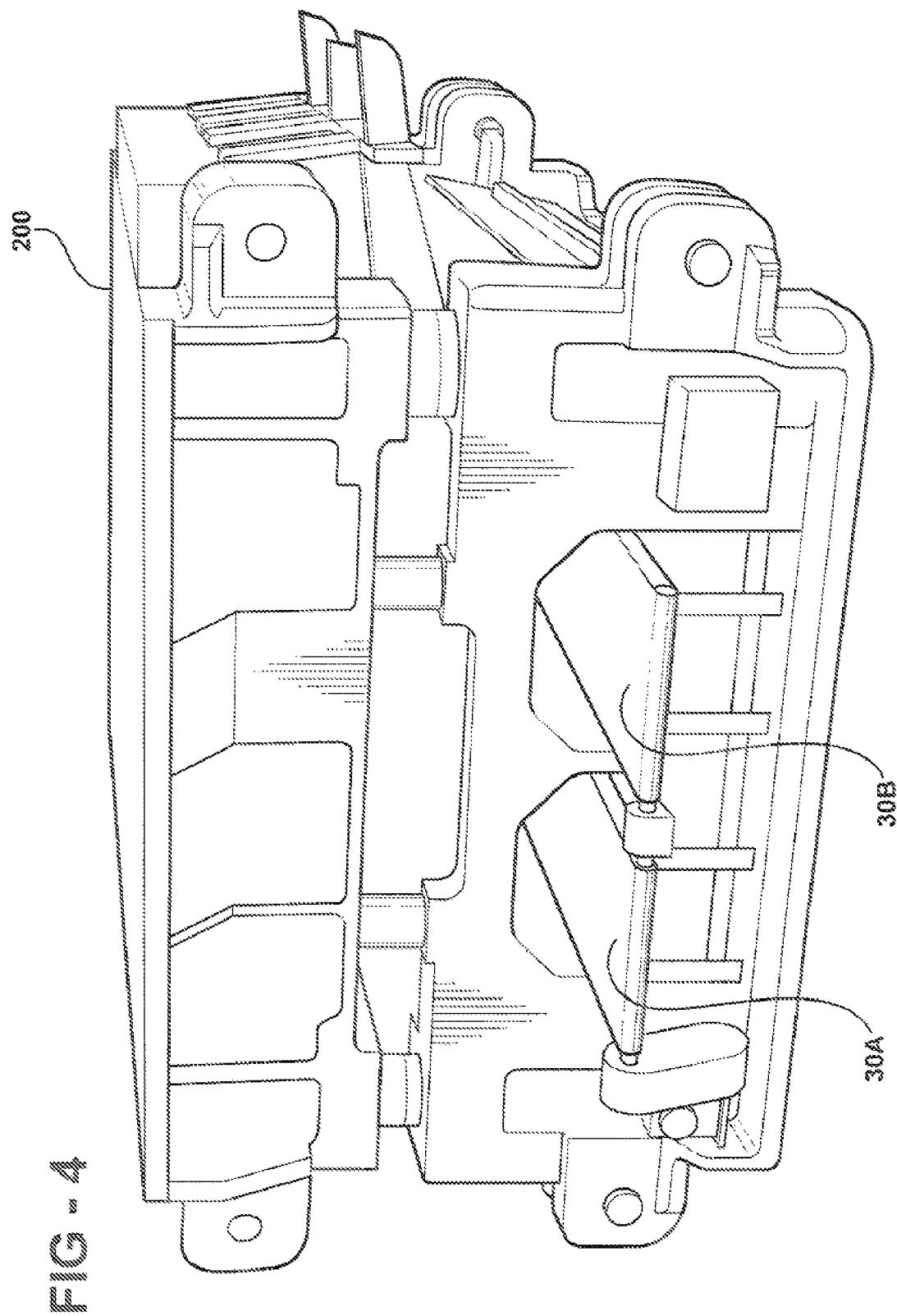
FIG. 4 is a perspective view of the stamping die press with a fixed conveyor mounted thereon according to the invention.

FIGS. 2-3 show cantilever roll-up conveyor arrangement 10 during operation. Drive-motor 150 is positioned on first end 50 for powering second track 65. Support rib 160 extends substantially the length of second track 65 and provides increased moveable conveyor rigidity. Additionally, rib 160 separates the second track into parallel tracks 65A and 65B (shown in FIGS. 2 and 3), which are complemented by separate parallel tracks 30A and 308 (shown in FIGS. 2 and 4). Track 65A may he interchangeable with track 65B and track 30A may be interchangeable with track 30B for additional flexibility in maintenance and repair of the cantilever roll-up conveyor arrangement.

FIG. 5 is a perspective view of moveable conveyor 40 not in operation. When the cantilever roll-up conveyor arrangement is not in use there may be a need to store moveable conveyor 40 along with one or more receptacle bins separately from die press 200. As shown in FIG. 5, there is sufficient space under second end 60 of the moveable conveyor to stow at least one receptacle bin 130. Such an arrangement will take up less space at the manufacturing facility than storing the moveable conveyor and receptacle bins separately when the cantilever roll-up conveyor arrangement is not in use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A conveyor arrangement for a stamping die employed within a stamping press, the conveyor arrangement comprising:
    a fixed conveyor having a protruding end and a first track, said fixed conveyor mounted on the die for receiving and shuttling stamped parts from the die; and
    a moveable conveyor having a supported first end, a cantilevered second end and a second track;
    wherein the moveable conveyor's cantilevered second end is arranged for positioning under the fixed conveyor's protruding end for receiving and shuttling stamped parts from the first track via the second track to a remote part collection area.

2. The conveyor arrangement of claim 1 wherein the stamping press is housed within an enclosure, the moveable conveyor's first end is positioned outside the enclosure and the second end is inserted through an aperture in said enclosure.

3. The conveyor arrangement of claim 1 further comprising a receptacle for positioning next to the moveable conveyor's first end for receiving stamped parts.

4. The conveyor arrangement of claim 3 wherein the moveable conveyor is arranged to accept the receptacle under the second end of the moveable conveyor when the conveyor arrangement is not in use.

5. The conveyor arrangement of claim 1 further comprising a ballast for counterweighing the moveable conveyor's second end.

6. The conveyor arrangement of claim 1 further comprising a drive-motor positioned at the moveable conveyor's first end for driving the second track.

7. The conveyor arrangement of claim 1 further comprising a rolling support positioned at the moveable conveyor's first end for transporting the moveable conveyor.

8. The conveyor arrangement of claim 7 wherein the first end of the moveable conveyor further comprises a regulator between the support and the first track for adjusting the vertical position of the second end of the moveable conveyor.

9. The conveyor arrangement of claim 8 wherein the regulator comprises a jack for raising or lowering the second end and a variable length linkage for fixing the vertical position.

10. The conveyor arrangement of claim 1 wherein the first and second tracks are belts.

11. The conveyor arrangement of claim 1 further comprising a support rib arranged on the moveable conveyor and extending substantially the length of the second track for increased conveyor rigidity.

12. The conveyor arrangement of claim 11 wherein the rib separates the second track into two parallel tracks.

13. The conveyor arrangement of claim 11 wherein the two parallel tracks are interchangeable.

* * * * *